(12) United States Patent
Muller

(10) Patent No.: US 7,970,963 B2
(45) Date of Patent: Jun. 28, 2011

(54) EFFICIENT BUFFER MANAGEMENT IN A MULTI-THREADED NETWORK INTERFACE

(75) Inventor: Shimon Muller, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 185 days.

(21) Appl. No.: 12/493,570

(22) Filed: Jun. 29, 2009

(65) Prior Publication Data

US 2010/0332698 A1    Dec. 30, 2010

(51) Int. Cl.
   *G06F 12/02*    (2006.01)
(52) U.S. Cl. ............................................. 710/56; 710/57
(58) Field of Classification Search ........................ None
   See application file for complete search history.

(56) References Cited

U.S. PATENT DOCUMENTS

| | | | |
|---|---|---|---|
| 5,675,829 A * | 10/1997 | Oskouy et al. | 710/6 |
| 5,689,509 A * | 11/1997 | Gaytan et al. | 370/396 |
| 5,740,448 A * | 4/1998 | Gentry et al. | 710/200 |
| 6,363,438 B1 * | 3/2002 | Williams et al. | 710/22 |
| 7,496,699 B2 * | 2/2009 | Pope et al. | 710/52 |
| 7,739,426 B1 * | 6/2010 | Steiss et al. | 710/52 |
| 7,802,250 B2 * | 9/2010 | Uhlig et al. | 718/1 |
| 7,818,389 B1 * | 10/2010 | Chiang et al. | 709/212 |
| 2004/0160446 A1 * | 8/2004 | Gosalia et al. | 345/503 |
| 2008/0040519 A1 * | 2/2008 | Starr et al. | 710/39 |

* cited by examiner

*Primary Examiner* — Cheng-Yuan Tseng
(74) *Attorney, Agent, or Firm* — Park, Vaughan, Fleming & Dowler LLP; Laxman Sahasrabuddhe

(57) ABSTRACT

Some embodiments of the present invention provide a system for receiving packets on a multi-threaded computing device which uses a memory-buffer-usage scorecard (MBUS) to enable multiple hardware threads to share a common pool of memory buffers. During operation, the system can identify a memory-descriptor location for posting a memory descriptor for a memory buffer. Next, the system can post the memory descriptor for the memory buffer at the memory-descriptor location. The system can then update the MBUS to indicate that the memory buffer is in use. Next, the system can store a packet in the memory buffer, and post a completion descriptor in a completion-descriptor location to indicate that the packet is ready to be processed. If the completion-descriptor indicates that the memory buffer is ready to be reclaimed, the system can reclaim the memory buffer, and update the MBUS to indicate that the memory buffer has been reclaimed.

14 Claims, 10 Drawing Sheets

EFFICIENT BUFFER MANAGEMENT IN A MULTI-THREADED NETWORK INTERFACE

BACKGROUND

1. Field

This disclosure generally relates to computer networking. More specifically, this disclosure relates to methods and apparatuses for receiving and handling data packets on a computer system with multiple hardware threads.

2. Related Art

A typical computer system communicates over a computer network using a network interface unit (NIU) that facilitates transmission and reception of data packets. High-performance NIUs usually support direct memory access (DMA) operations. A descriptor ring is typically used to manage memory buffers for storing received packets. A driver allocates memory buffers for storing received packets, and posts descriptors for the memory buffers on the descriptor ring. The NIU fills the memory buffers as packets are received and notifies the driver when the packets are ready to be consumed. The NIU also notifies the driver when a memory buffer is ready to be recycled.

It is generally desirable to improve the performance of the receive path in multi-processor systems. Unfortunately, conventional buffer management techniques that use descriptor rings are designed to support a single hardware thread. Hence, using a conventional buffer management technique in a multi-processor system which supports multiple hardware threads can cause severe performance degradation. Note that using a separate descriptor ring for each hardware thread is not desirable because it can waste memory resources.

SUMMARY

Some embodiments of the present invention provide a system for receiving packets on a multi-threaded computing device which uses a memory-buffer-usage scorecard to enable multiple hardware threads to share a common pool of memory buffers. During operation, the system can identify a memory-descriptor location for posting a memory descriptor for a memory buffer. Next, the system can post the memory descriptor for the memory buffer at the memory-descriptor location. The system can then update the memory-buffer-usage scorecard to indicate that the memory buffer is in use.

When a packet is received, the system can store the packet in the memory buffer, and post a completion descriptor in a completion-descriptor location to indicate that the packet is ready to be processed. If the completion-descriptor indicates that the memory buffer is ready to be reclaimed, the system can reclaim the memory buffer, and update the memory-buffer-usage scorecard to indicate that the memory buffer has been reclaimed.

Some embodiments of the present invention provide a system for receiving packets on a multi-threaded computing device by allowing multiple hardware threads on the computing device to efficiently share a receive buffer ring (RBR) and a receive completion ring (RCR). Specifically, some embodiments use a buffer-posting and reclaim array (BPRA) to manage the RBR and the RCR. Note that the BPRA is an example of a memory-buffer-usage scorecard. The BPRA enables multiple hardware threads to post and reclaim memory buffers in an out-of-order sequence, thereby allowing the multiple threads to efficiently share an RBR and an RCR without causing head-of-line blocking. Note that an RBR entry is an example of a memory-descriptor location, and an RCR entry is an example of a completion-descriptor location.

The BPRA is partitioned into multiple regions, and each BPRA entry in a BPRA region is associated with an RBR entry. Specifically, the size of each BPRA region can be equal to the size of the RBR, so that each BPRA region can have an entry for each RBR entry.

The system can use a BPRA region until it detects a collision. Once a collision is detected, the system can store an indicator which indicates the location of the collision, and switch to a different BPRA region where a corresponding BPRA entry is available. The system can then start using the new BPRA region until another collision is detected.

When the system receives an indication from the RCR that a memory buffer is ready to be reclaimed, the system can reclaim the memory buffer from the RCR, and modify the BPRA entry associated with the memory buffer to indicate that the memory buffer has been reclaimed. The system avoids head-of-line blocking because, whenever the system detects a collision, the system switches to a different BPRA region.

An RBR descriptor can include the following fields: a memory buffer address, a BPRA region identifier, and an offset into a buffer address lookup table. The RBR descriptor can also include fields to enable the system to release memory buffers whenever required.

Specifically, the RBR descriptor can include a "flush all" field, e.g., a 1-bit field, which forces the system to release all memory buffers that are currently being used to store packet buffers, regardless of their occupancy state. A software driver can use this bit to get access to all of the memory buffers within a deterministic period of time.

Further, the RBR descriptor can include a "flush distance vector" field which instructs the system to release the current buffer if the distance between the RBR index of the current buffer and the RBR index of the last buffer that was prefetched exceeds the value of the field. A zero value in this field should be ignored.

Additionally, the RBR descriptor can include a "flush timer" field which instructs the system to release the current buffer if the elapsed time since the last packet was stored in the current buffer exceeds the value that has been programmed in this field by the software driver. Again, a zero value in this field should be ignored.

An RCR descriptor can include the following fields: a memory buffer status, a memory buffer type, a packet buffer offset which indicates the location of the packet within the memory buffer, a packet length, a packet status which indicates the type of the packet and the hardware processing status of the packet, and a handle which includes a BPRA region identifier and an offset into the buffer address lookup table.

DETAILED DESCRIPTION

The following description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

Network Interface Unit

Figure 1:
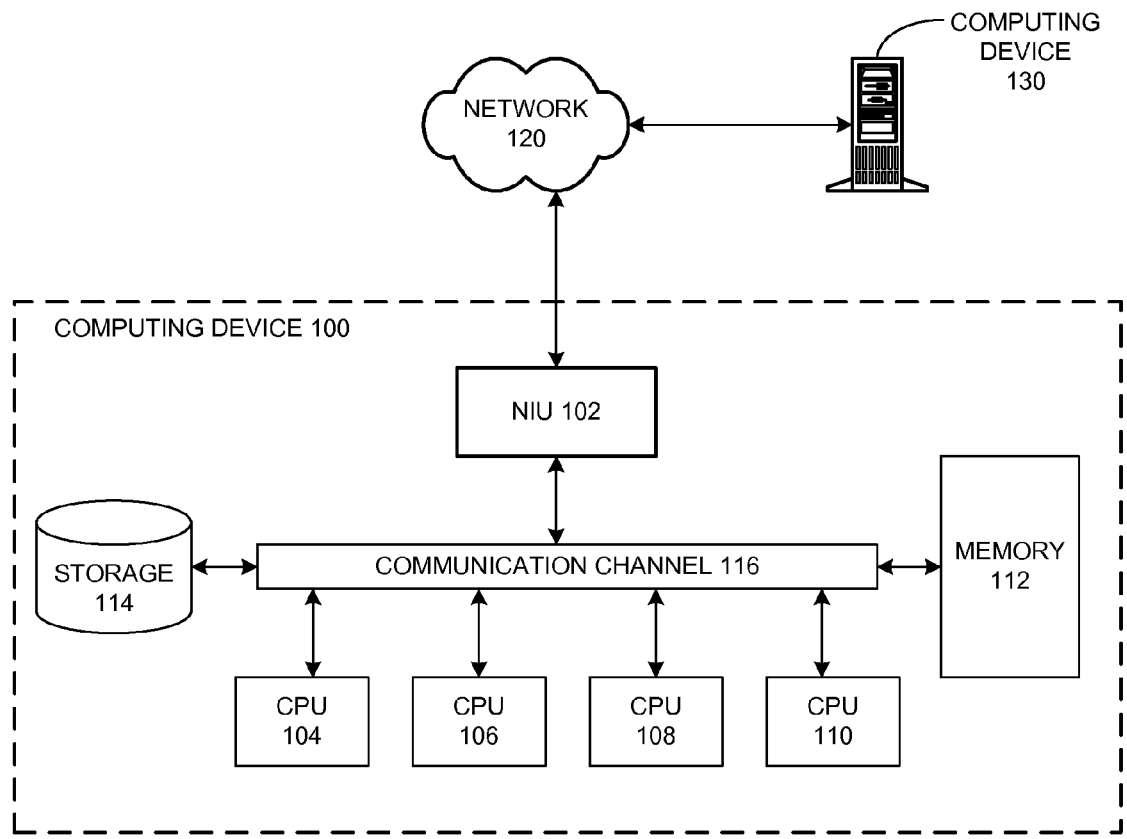
FIG. 1 illustrates a network interface unit (NIU) in a host computing device in accordance with an embodiment of the present invention.

FIG. 1 illustrates a network interface unit (NIU) in a host computing device in accordance with an embodiment of the present invention.

Computing device 100 includes methods and apparatus for communicating data packets to and from a remote computing device 130 via a network 120 such as the Internet. Specifically, computing device 100 includes NIU 102, a set of central processing units (CPUs) 104-110, a memory device 112, and a storage device 114, such that NIU 102 can communicate with units 104-114 via communication channel 116, which can include one or more buses and/or crossbar switches. Computing device 100 can include multiple levels of caches (not shown), and each CPU can include multiple cores (not shown), thereby enabling each CPU to execute multiple hardware threads.

During operation, NIU 102 can control the operations required for receiving data packets at computing device 100. Furthermore, NIU 102 and computing device 100 implement methods for handling the packets received by NIU 102. Specifically, a software driver executing on computing device 100 can allocate a memory buffer (i.e., a memory block in memory device 112), and post a buffer descriptor for the memory buffer on a receive buffer ring (RBR) of NIU 102. Each memory buffer can contain one or more packet buffers. After NIU 102 stores a packet in a packet buffer, NIU 102 posts a completion descriptor for the packet buffer on a receive completion ring (RCR) of NIU 102, and notifies the software driver that the completion descriptor has been posted. The software driver then retrieves the data packets from the memory buffer. If the completion descriptor indicates that the associated memory buffer is ready to be reclaimed, the driver reclaims the memory buffer so that the memory buffer can be recycled back to the RBR.

The RBR of NIU 102 can be shared by multiple hardware processes. These independent threads may reclaim a set of memory buffers in a different order from which they were originally posted on the RBR. This can create a "hole" in a sequence of buffer descriptors posted on the RBR, which needs to be accommodated by a buffer reclaim process that allows buffers to be reclaimed in an out-of-order fashion. Computing device 100 can provide an out-of-order buffer reclaim policy by using a BPRA data structure.

Memory buffers can be categorized into different types based on the size of the packets that will be stored in them. For example, NIU 102 may support four memory buffer categories for a packet buffer: small (S), medium (M), large (L), and extra-large (XL). Note that a small-sized packet buffer can be 128 bytes in length, a medium-sized packet buffer can be 512 bytes in length, a large-sized packet buffer can be 2 kilobytes in length, and an extra-large sized packet buffer can be a memory page size in length. Furthermore, NIU 102 also supports a jumbo frame packet size, which allows a single packet, or a portion of a packet, to consume an entire memory buffer. These size categories provide the NIU with a flexibility that allows for efficient utilization of main memory, while preserving data locality for low overhead software processing. Also note that the memory buffers may be aligned based on a memory block size, e.g., the memory buffers can be 4 KB-aligned.

Receive Buffer Ring

Figure 2:
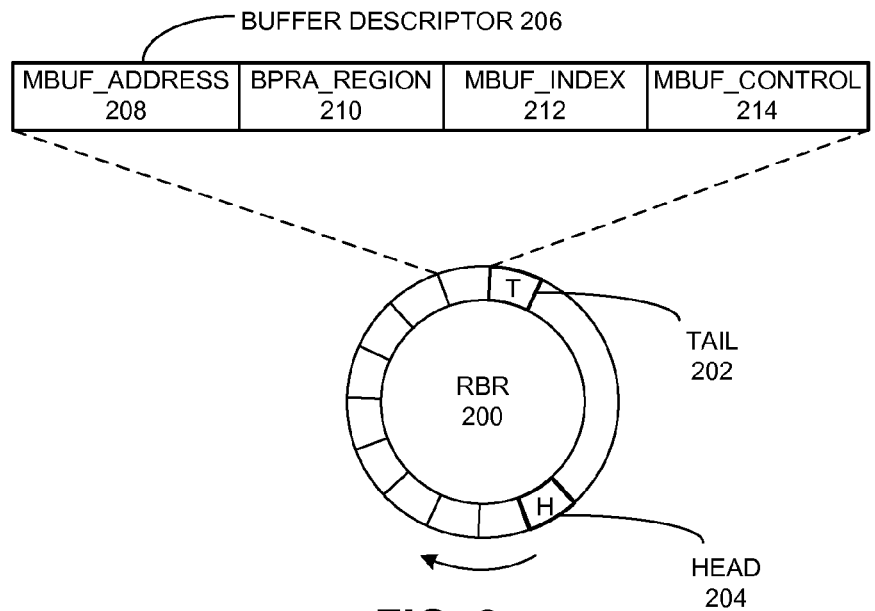
FIG. 2 illustrates data structures for a receive buffer ring (RBR) in accordance with an embodiment of the present invention.

FIG. 2 illustrates data structures for a receive buffer ring in accordance with an embodiment of the present invention.

RBR 200 includes tail 202, head 204, and other entries which can be used to store buffer descriptors (e.g., buffer descriptor 206). Tail 202 is the most recently posted descriptor, and indicates the last memory buffer that the NIU is allowed to use. A software driver posts a memory buffer on the RBR by inserting a buffer descriptor for the memory buffer at an RBR location ahead of tail 202. Then, the software driver notifies the NIU of the new buffer descriptor by advancing the tail pointer so that it references the new buffer descriptor in RBR 200.

As the NIU receives data packets, the NIU consumes the memory buffers posted between head 204 and tail 202 (illustrated in FIG. 2 by a clock-wise arrow). When memory buffers are recycled, the NIU advances the head pointer so that additional memory buffers can be posted on RBR 200.

Buffer descriptor 206 can include the following fields: MBUF_ADDRESS 208 (i.e., a buffer address), BPRA_REGION 210, MBUF_INDEX 212 (i.e., a buffer index), and MBUF_CONTROL 214 (i.e., control fields which instruct the hardware to release buffers either unconditionally or under certain conditions).

MBUF_ADDRESS 208 stores a memory address for a memory buffer, and BPRA_REGION 210 and MBUF_INDEX 212 make up a "handle" for the memory buffer. BPRA_REGION 210 specifies a BPRA region, and MBUF_INDEX 212 specifies an index into a lookup table that stores the memory address for the corresponding memory buffer. Note that the "handle" can be used as an index for the BPRA.

MBUF_CONTROL 214 may include multiple fields, such as, FLUSH_ALL, FLUSH_DISTANCE_VECTOR, and FLUSH_TIMER. The FLUSH_ALL field can be a 1-bit field which forces the system to release all memory buffers that are currently being used to store packet buffers, regardless of their occupancy state. A software driver can use this bit to get access to all of the memory buffers within a deterministic period of time. The FLUSH_DISTANCE_VECTOR field can be used to instruct the system to release the current buffer if the distance between the RBR index of the current buffer and the RBR index of the last buffer that was pre-fetched exceeds the value of this field. The system may ignore this field if its value is zero. The FLUSH_TIMER field can be used to instruct the system to release the current buffer if the elapsed time since the last packet was stored in the current buffer exceeds the value that has been programmed in this field by the software driver. Again, the system may ignore this field if its value is zero.

For example, MBUF_ADDRESS 208 may store the 32 most significant bits of a memory address, BPRA_REGION 210 may be a two-bit field that indicates the RBR region, and MBUF_INDEX 212 may be a 12-bit index into the memory address lookup table. Note that, in this particular example, the RBR has 4K entries and the BPRA has 16K entries, and the "handle," i.e., the combination of the BPRA_REGION 210 and the MBUF_INDEX 212, can be used to index into the BPRA.

Receive Completion Ring

Figure 3:
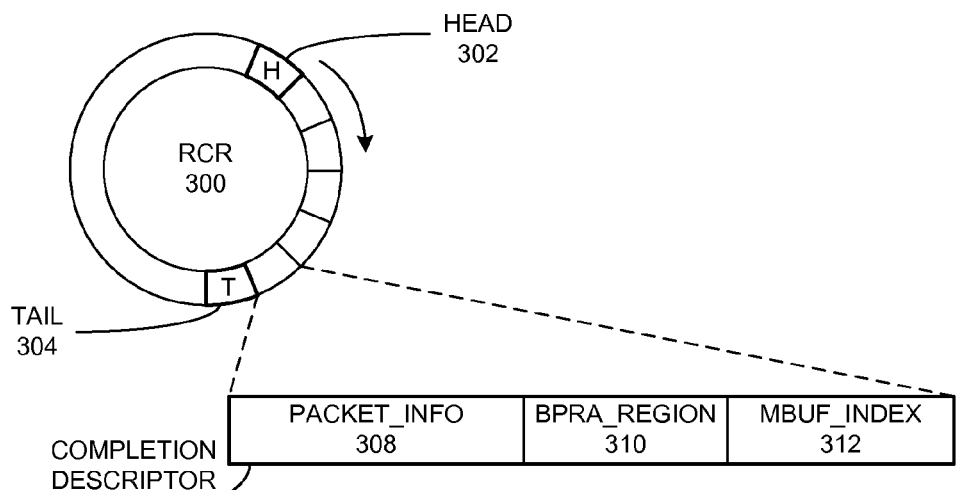
FIG. 3 illustrates data structures for a receive completion ring (RCR) in accordance with an embodiment of the present invention.

FIG. 3 illustrates data structures for a receive completion ring (RCR) in accordance with an embodiment of the present invention.

RCR 300 includes head 302, tail 304, and a set of entries which store completion descriptors, e.g., completion descriptor 306. The NIU uses RCR 300 to indicate to a software driver that a data packet has been received and is stored in a corresponding packet buffer by inserting a completion descriptor for the packet buffer at an RCR location ahead of tail 304. Then, the NIU notifies the software driver of the new packet buffer by advancing the tail pointer so that it references the new completion descriptor in RBR 300.

The software driver retrieves data packets by using the completion descriptors between head 302 and tail 304 (illustrated in FIG. 3 by a clock-wise arrow). As the packets are retrieved by the software driver, the driver advances the head pointer so that the NIU can post additional packet buffers on RCR 300.

A completion descriptor 306 can include the following fields: PACKET_INFO 308, BPRA_REGION 310, and MBUF_INDEX 312. PACKET_INFO 308 can include information about the packet, and/or information about the memory buffer in which the packet is stored. BPRA_REGION 310 and MBUF_INDEX 312 store the "handle" for the memory buffer, which can be copied directly from the handle in a buffer descriptor (i.e., from BPRA_REGION 210 and MBUF_INDEX 212 in buffer descriptor 206 of FIG. 2). BPRA_REGION 310 specifies a BPRA region, and MBUF_INDEX 312 specifies an index into a lookup table that stores the memory address for the corresponding memory buffer. Note that the "handle" can be used as an index for the BPRA.

Note that it is possible that a set of data packets may not fill a corresponding memory buffer within an allotted time window. When this occurs, it may be necessary for a software driver to reclaim a memory buffer that the NIU has been holding on to for longer than the allotted time period. The software driver can use a control field in the RBR descriptor, e.g., MBUF_CONTROL 214, to achieve this.

Figure 4:
FIG. 4 illustrates a packet information field of a completion descriptor in accordance with an embodiment of the present invention.

FIG. 4 illustrates a packet information field of a completion descriptor in accordance with an embodiment of the present invention.

PACKET_INFO 400 can include the following fields: MBUF_STATUS 402, MBUF_TYPE 404, PBUF_OFFSET 406, PKT_LENGTH 408, and PKT_STATUS 410. MBUF_STATUS 402 can indicate the status of the current memory buffer. A software driver can use MBUF_STATUS 402 to determine how it should process a packet buffer. For example, MBUF_STATUS 402 can be a two-bit field whose encoding is as follows:

00: A new packet has been stored in the corresponding memory buffer. The memory location for the packet can be determined by interpreting the values stored in MBUF_TYPE 404 and PBUF_OFFSET 406. The current buffer is still owned by the hardware.

01: The current buffer is of XL (extra large) type and it contains a new partial jumbo frame. The remainder of this jumbo frame can be found in one or more following completion descriptors. The current completion descriptor stores "11" in MBUF_TYPE 404, and stores 0x00 in PBUF_OFFSET 406. The current memory buffer is released back to software and it can be recycled to the RBR.

10: A new packet has been stored in the memory buffer. The memory location for the packet can be determined by interpreting the values stored in MBUF_TYPE 404 and PBUF_OFFSET 406. The current memory buffer is released back to the software driver if one or more of the following conditions are met:

The current buffer is of either S, M or L types, and the value stored in PBUF_OFFSET 406 points to the last packet buffer in the current memory buffer (normal case).

The current buffer is of XL type, and it contains the last portion of a jumbo frame.

The NIU was instructed by the software driver to release all its memory buffers while the NIU was in the process of receiving the current packet.

11: The current memory buffer does not contain a new packet. It is released back to the software because the NIU was instructed to release the memory buffer. The values stored in MBUF_TYPE 404 and PBUF_OFF-SET 406 are invalid and should be ignored.

MBUF_TYPE 404 can indicate the type of the memory buffer in which this packet is stored. For example, MBUF_TYPE 404 can be a two-bit field which indicates the type of the current memory buffer. An exemplary encoding for the two bits of MBUF_TYPE 404 is as follows: "00" indicates a small (S) packet buffer; "01" indicates a medium (M) packet buffer; "10"indicates a large (L) packet buffer; and "11" indicates an extra-large (XL) packet buffer.

PBUF_OFFSET 406 can indicate the start of the packet buffer within the current memory buffer. For example, PBUF_OFFSET 406 can be an 8-bit field. PKT_LENGTH 408 can be a 14-bit field which indicates the length of the packet. PKT_STATUS 410 can store a set of packet status indicators which provide a software driver with information it needs to process a data packet. The status information can include a packet type (e.g., TCP, UDP, SCTP, FCoE, Broadcast/Multicast, VLAN), and a hardware processing status (e.g., an error condition), and/or any other status information that the software may need to determine how to process the packet.

Buffer-Posting-and-Reclaim Array

Figure 5:
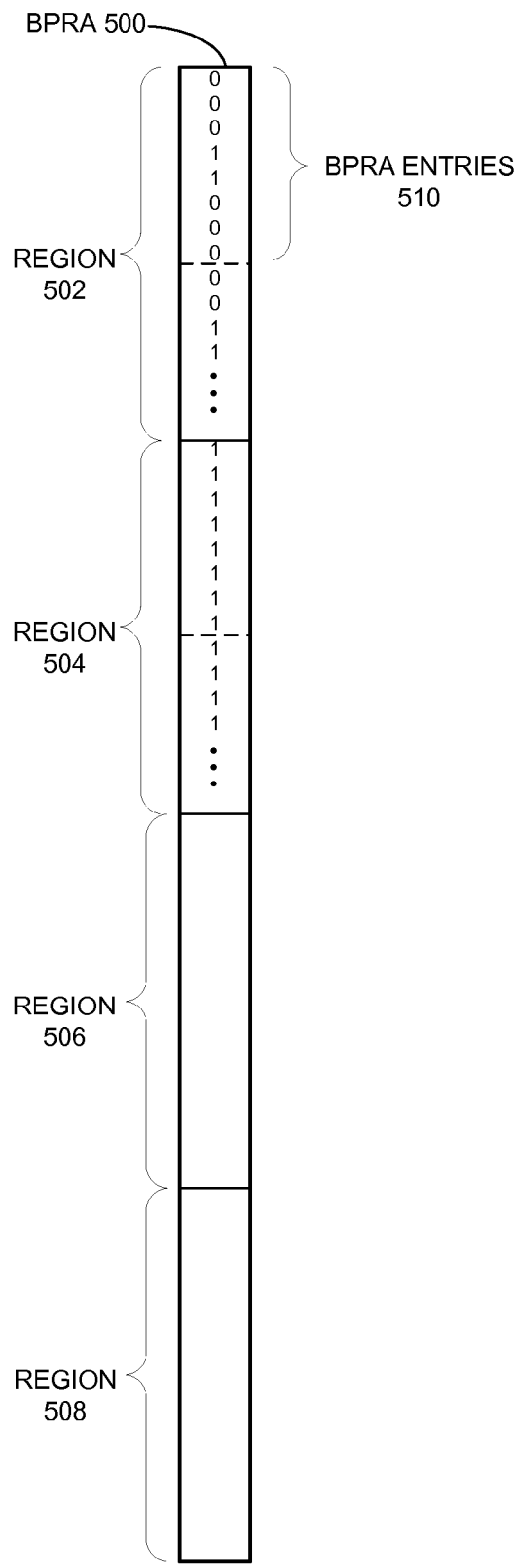
FIG. 5 illustrates a buffer-posting-and-reclaim array (BPRA) in accordance with an embodiment of the present invention.

FIG. 5 illustrates a buffer-posting-and-reclaim array (BPRA) in accordance with an embodiment of the present invention.

BPRA 500 is a logical bit array which can be partitioned into a set of regions (e.g., regions 502-508), and can be stored in main memory of a computing device. A region of the BPRA is indicated by the BPRA_REGION field of a buffer descriptor or a completion descriptor. Value "00" of the BPRA_REGION field can correspond to region 502, value "01" can correspond to region 504, value "10" can correspond to region 506, and value "11" can correspond to region 508.

The length of the logical bit array is programmable, and can be programmed to be equal to a multiple of the number of entries that can be stored in the RBR. For example, the size of the logical bit array can be four times the maximum number of memory buffers that can be posted on the RBR. Furthermore, a bit in a region of BPRA 500 corresponds to an entry in the RBR of the NIU. In other words, each entry in the RBR can have a corresponding bit in each region of the BPRA.

A software driver can initialize the NIU by posting a set of buffer descriptors on the RBR for a set of memory buffers. The software driver can initialize the BPRA_REGION field of a buffer descriptor to "00" which can correspond to region 502, and set the MBUF_INDEX field of the buffer descriptor to the offset in the address lookup table associated with the corresponding memory buffer. The entries in region 502, that correspond to MBUF_INDEX of the above-mentioned posted buffers, can be initialized to a logic one value, and the tail pointer of the RBR can be updated to enable the NIU to begin using these buffers for storing received packets.

During operation, the software driver sets a bit for a BPRA entry in BPRA 500 when a buffer descriptor is posted to a corresponding entry in the RBR. The software driver clears the bit for the BPRA entry when the associated memory buffer has been reclaimed through the RCR. Memory buffers can be processed either individually or in groups. For example, the memory buffers can be posted in batches of eight.

Note that a software driver continues to use one BPRA region (e.g., region 502) to post memory buffer descriptors onto the RBR until a collision is detected in that BPRA region. A collision can occur when the software driver tries to post a buffer descriptor in an entry of the RBR which currently points to a memory buffer that has not been reclaimed. For example, a collision would occur if the software driver tries to post a batch of eight descriptors to the RBR that corresponds to BPRA entries 510 in region 502.

When a collision is detected in a BPRA region, the computer system records in memory the index location of the BPRA region where the collision occurred (which is identified by the tail pointer of the RBR), and continues by using a next BPRA region (e.g., region 504) to post memory buffer descriptors onto the RBR. Note that, because a BPRA is used to handle collisions, the NIU can support multiple hardware threads while using a single RBR.

Figure 6:
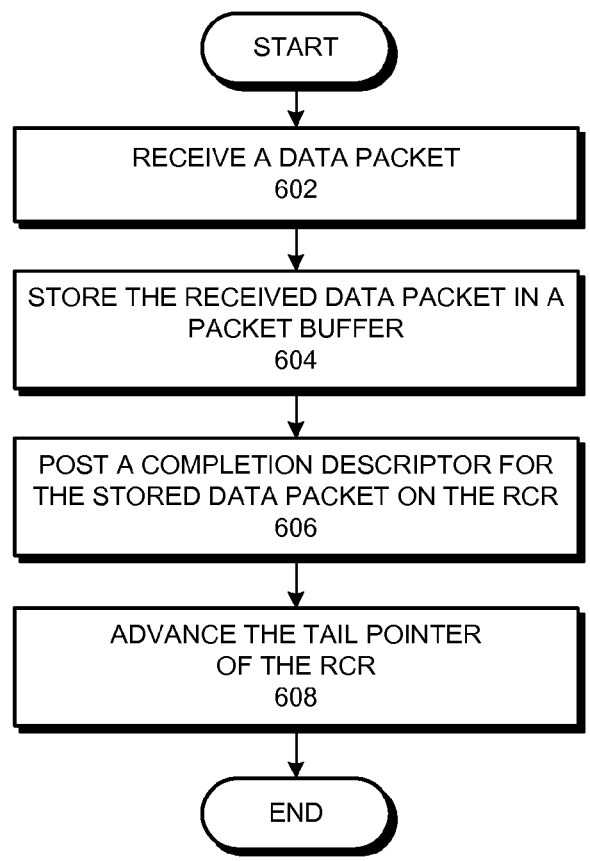
FIG. 6 presents a flow chart illustrating a process for storing data packets in memory buffers in accordance with an embodiment of the present invention.

FIG. 6 presents a flow chart illustrating a process for storing data packets in memory buffers in accordance with an embodiment of the present invention.

The NIU can begin by receiving a data packet (operation 602), and storing the received data packet in a packet buffer (operation 604). The NIU then posts a completion descriptor for the stored data packet on the RCR (operation 606), and advances the tail pointer of the RCR to include the new completion descriptor between the head pointer and the tail pointer of the RCR (operation 608).

Figure 7:
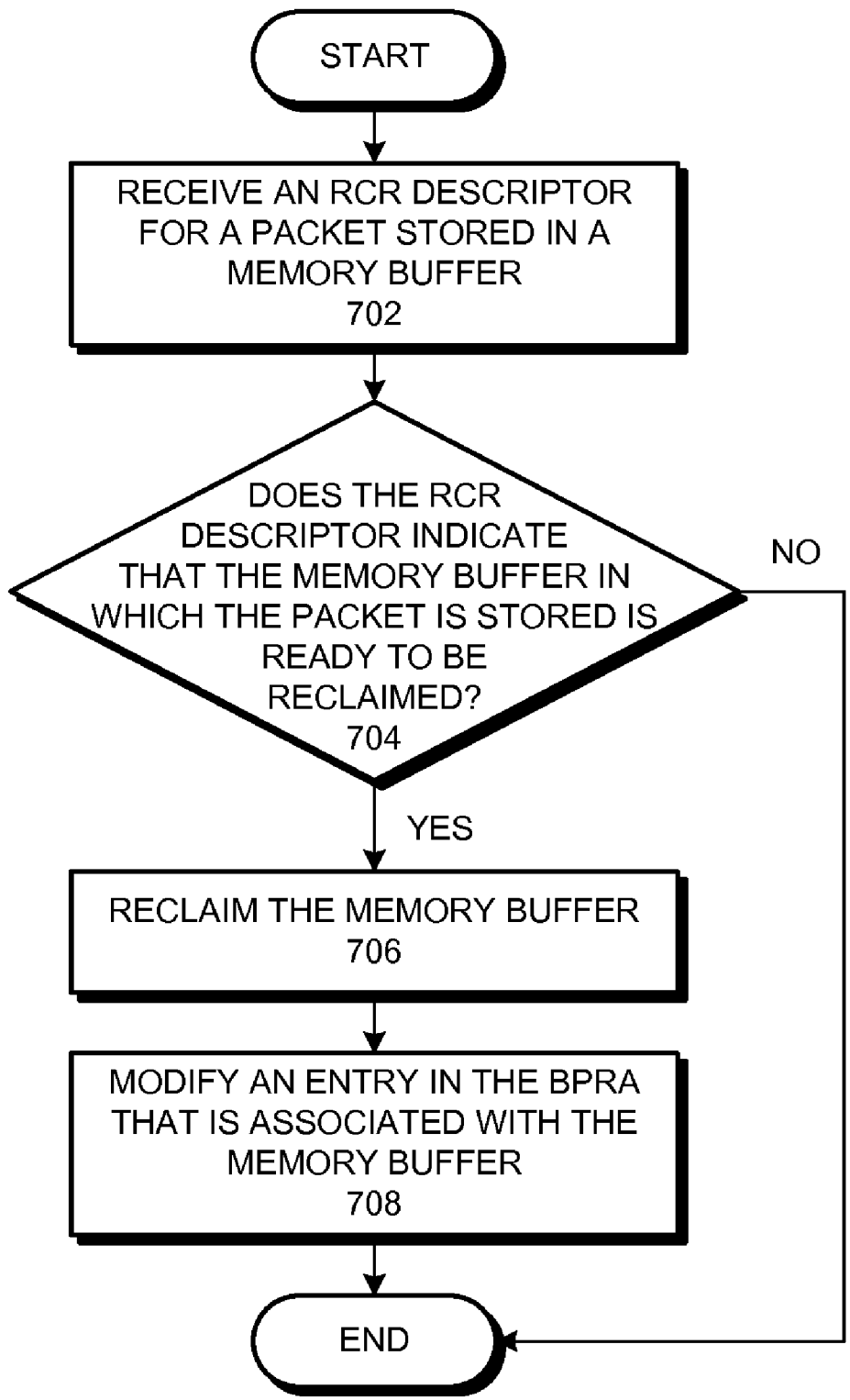
FIG. 7 presents a flow chart illustrating a process for reclaiming memory buffers in accordance with an embodiment of the present invention.

FIG. 7 presents a flow chart illustrating a process for reclaiming memory buffers in accordance with an embodiment of the present invention.

The process can begin by receiving an RCR descriptor for a packet stored in a memory buffer (operation 702). Next, the system can determine whether the RCR descriptor indicates that the memory buffer in which the packet is stored is ready to be reclaimed (operation 704). If the RCR descriptor indicates that the memory buffer is ready to be reclaimed, the system can reclaim the memory buffer (operation 706), and post it on the RBR at a later point in time. On the other hand, if the RCR descriptor indicates that the memory buffer is not ready to be reclaimed (e.g., the memory buffer is not full), the system can continue retrieving packets. As part of reclaiming the memory buffer, the system modifies an entry in the BPRA that is associated with the memory buffer (operation 708) to indicate that the memory buffer has been reclaimed. For example, the system can use the handle stored in the RCR descriptor to index into the BPRA and clear the BPRA bit.

Figure 8:
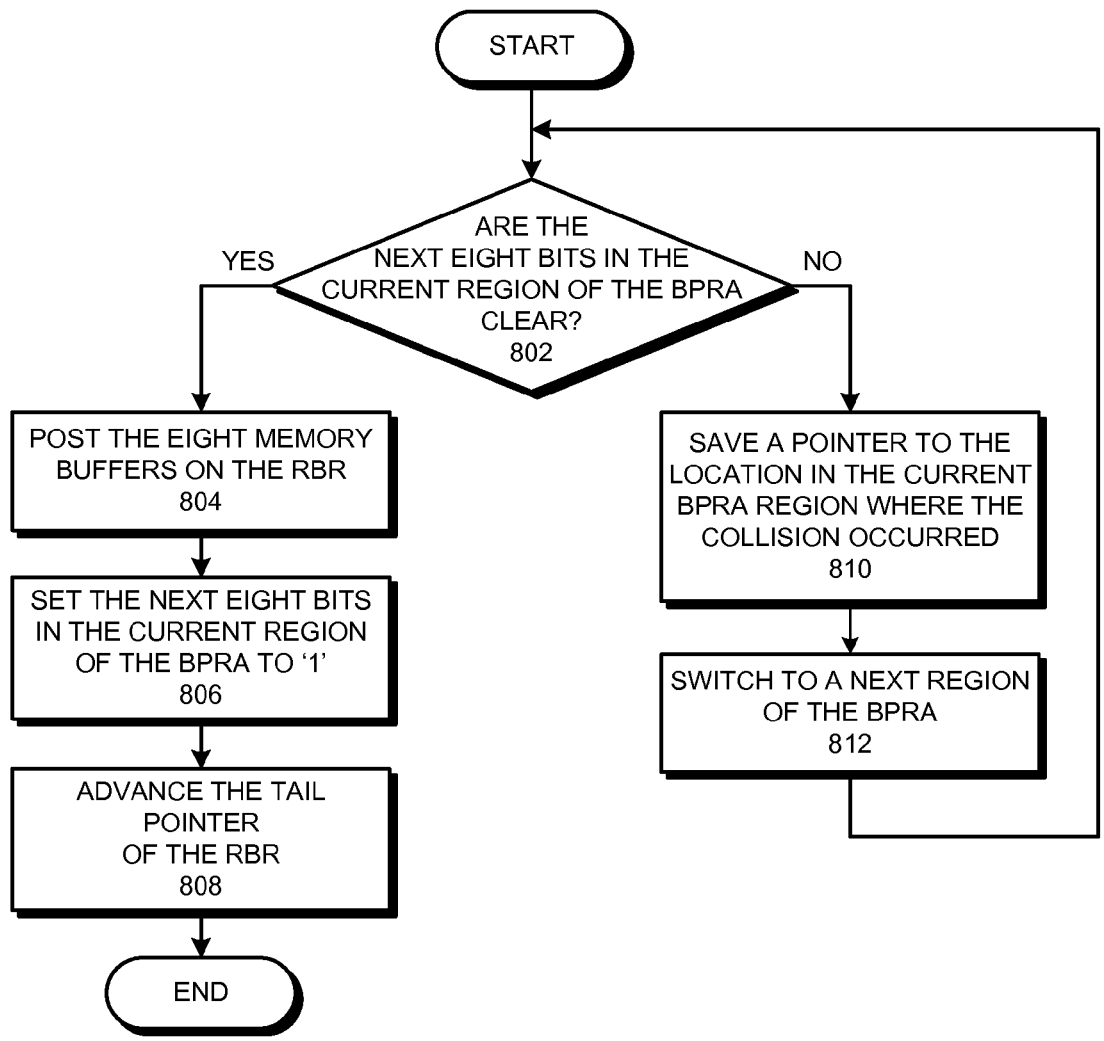
FIG. 8 presents a flow chart illustrating a process for posting memory buffers on an RBR in accordance with an embodiment of the present invention.

FIG. 8 presents a flow chart illustrating a process for posting memory buffers on an RBR in accordance with an embodiment of the present invention.

Memory buffers can be posted individually or in batches. In the process illustrated in FIG. 8, the memory buffers are posted in batches of eight, but it will be apparent to one skilled in the art that the memory buffers can also be posted in smaller or larger batches. The software driver can begin by determining whether the next eight bits in the current region of the BPRA (e.g., BPRA region "00") are clear (operation 802). Note that the set of eight bits are indexed by the tail entry of the RBR, and they are used to determine whether their corresponding buffers have been returned in order (i.e., the eight bits have been cleared).

If the eight bits have been cleared, the software driver posts the eight free memory buffers on the RBR (operation 804), sets the corresponding array bits in the current region to a logic one (operation 806), and advances the tail pointer of the RBR (operation 808) to notify the NIU that new memory buffers have been posted on the RBR.

If at least one of the eight bits is set to a logic one, a "hole" has been created in the buffer return sequence, which may cause a "collision" in the MBUF_INDEX (i.e., multiple memory buffers mapping to the same MBUF_INDEX). To handle such collisions, the software driver saves a pointer to the location in the current BPRA region where the collision occurred (operation 810), and switches to a next region of the BPRA (operation 812). Note that after switching, the next region is referred to as the "current" region. For example, the software driver can switch from region "00" to region "01" of the BPRA. At this point, region "01" becomes the current region.

The software driver can then go back to operation 802 and check if the next eight bits in the current region of the BPRA are clear. The system keeps switching regions until it finds a BPRA region in which the next eight bits are clear. Once the system finds such a region, the system posts the memory buffers.

The system can use the new BPRA region until another collision is detected. Specifically, if a collision is detected while using BPRA region "01," the system can save the location of the collision, and switch to region "10." Next, if a collision is detected while using BPRA region "10," the system can save the location of the collision, and switch to region "11." Finally, if a collision is detected while using BPRA region "11," the system can save the location of the collision, and check the state of BPRA regions "00," "01," and "10" using the saved locations to identify a BPRA region in which the collision was resolved. At least one of the BPRA regions should have the collision resolved, if any network traffic is being received by the NIU. Once the system identifies a BPRA region which does not have a collision, the system can switch to that BPRA region. Note that the same memory buffers are recycled as packets are received by the NIU and processed by the software driver; only the "handle" used by buffer descriptors and completion descriptors changes when a collision is detected.

A software driver may use one or more fields in MBUF_CONTROL 214 to release memory buffers either unconditionally or under certain conditions. Specifically, MBUF_CONTROL 214 can include a FLUSH_ALL field, a FLUSH_DISTANCE_VECTOR field, and a FLUSH_TIMER field. The FLUSH_ALL field can be used to force the NIU to release all memory buffers that are currently being used to store packet buffers, regardless of their occupancy state. The FLUSH_DISTANCE_VECTOR field can be used to instruct the NIU to release the current buffer if the distance between the RBR index of the current buffer and the RBR index of the last buffer that was pre-fetched exceeds the value of this field. The NIU may ignore this field if its value is zero. The FLUSH_TIMER field can be used to instruct the NIU to release the current buffer if the elapsed time since the last packet was stored in the current buffer exceeds the value that has been programmed in this field by the software driver. Again, the NIU may ignore this field if its value is zero.

Once a data packet's completion descriptor has been stored in the RCR, and the RCR tail pointer has been updated, the packet is ready to be processed by the software. The NIU can provide an optional interrupt and/or a completion mailbox update to the software driver at periodic (programmable) intervals, which can be based on the number of packets received and/or the time elapsed. A completion mailbox includes at least recent values for the head and tail pointers for the RBR and the RCR. This allows the software driver to poll a location in main memory to determine the pointer values, rather than performing expensive operations such as polling a register in the NIU or relying on an interrupt procedure.

Figure 9:
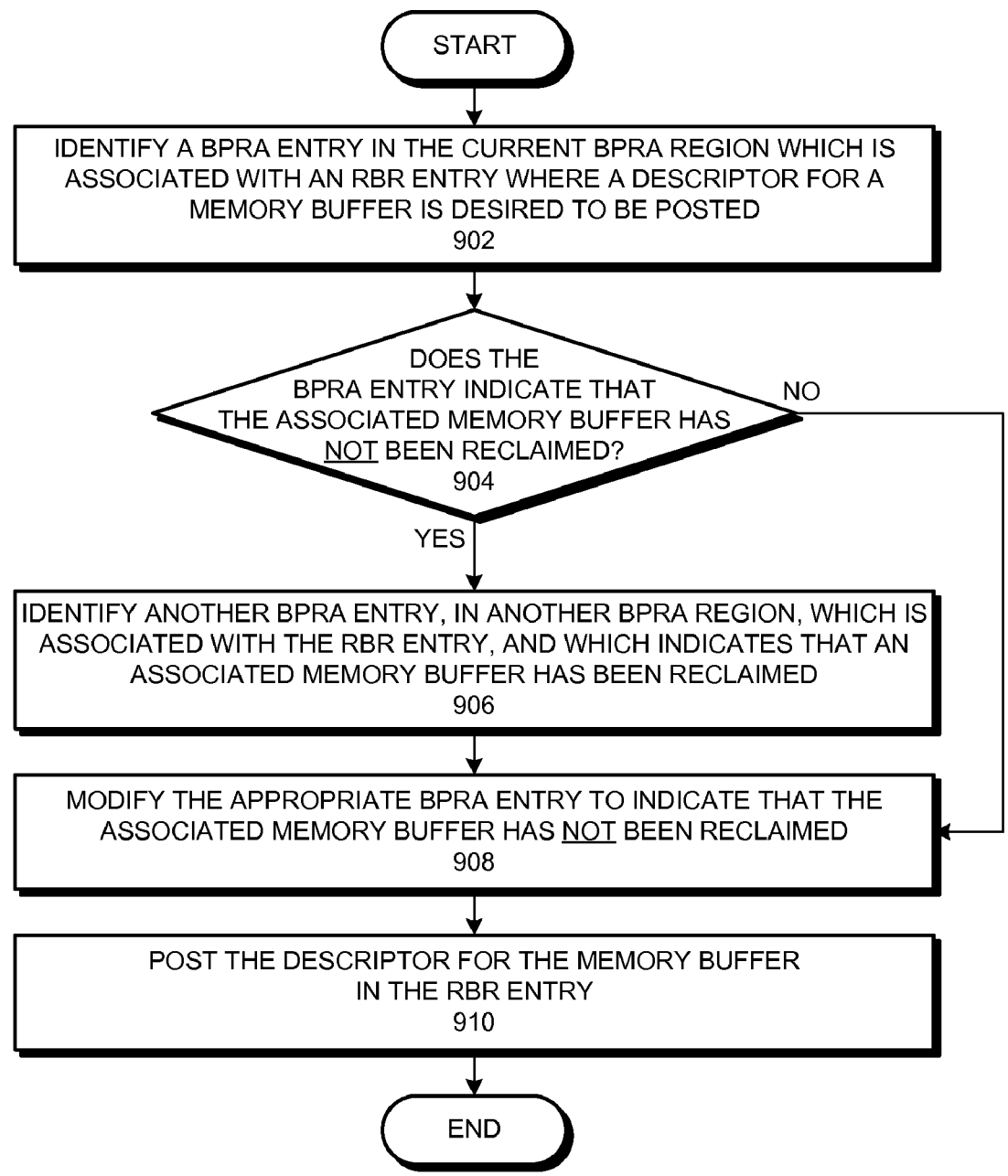
FIG. 9 presents a flow chart illustrating a process for posting a memory buffer in accordance with an embodiment of the present invention.

FIG. 9 presents a flow chart illustrating a process for posting a memory buffer in accordance with an embodiment of the present invention.

The process can begin by identifying a BPRA entry in the current BPRA region which is associated with an RBR entry where a descriptor for a memory buffer is desired to be posted (operation 902). For example, the system can use the handle stored in the tail of the RBR to index into the BPRA to identify the BPRA entry which is associated with the RBR entry where a descriptor for the memory buffer is desired to be posted.

Next, the system determines whether the BPRA entry indicates that the associated memory buffer has not been reclaimed (operation 904). For example, if the BPRA entry is equal to "1," the associated memory buffer is not reclaimed, and if the BPRA entry is equal to "0," the associated memory buffer is reclaimed.

If the associated memory buffer has not been reclaimed, the system identifies another BPRA entry, in another BPRA region, which is associated with the RBR entry, and which indicates that an associated memory buffer has been reclaimed (operation 906). For example, if the BPRA entry in BPRA region "00" is equal to "1," the system can identify a corresponding BPRA entry in another region, e.g., region "01," which is equal to "0."

When the system is trying to identify an available BPRA entry in another region, the system can keep track of all the BPRA entries where collisions were detected. For example, if the system determines that a BPRA entry in BPRA region "00" is equal to "1," the system can store a pointer to this BPRA entry, and check if a corresponding entry in BPRA region "01" is available. If the entry in region "01" is also not available, the system can store the pointer to the entry in region "01," and try region "10." If region "10" also doesn't work, the system can similarly store the pointer, and try region "11." If the entry in region "11" is also equal to "1," the system can use the saved pointers to go back and check the previous BPRA entries where collisions were detected. One of those BPRA entries should now be available if the system has been processing packets and reclaiming memory buffers.

Once the system identifies the BPRA entry, the system then modifies the appropriate BPRA entry to indicate that the associated memory buffer has not been reclaimed (operation 908). For example, if the BPRA entry in the current region, e.g., region "00," was equal to "0," the system can simply set its value to "1." On the other hand, if the system had to switch to a new BPRA region, the system can set the value of the corresponding entry in the new BPRA region to "1." Next, the system posts the buffer descriptor for the memory buffer in the RBR entry (operation 910).

Receive DMA Engine

Figure 10:
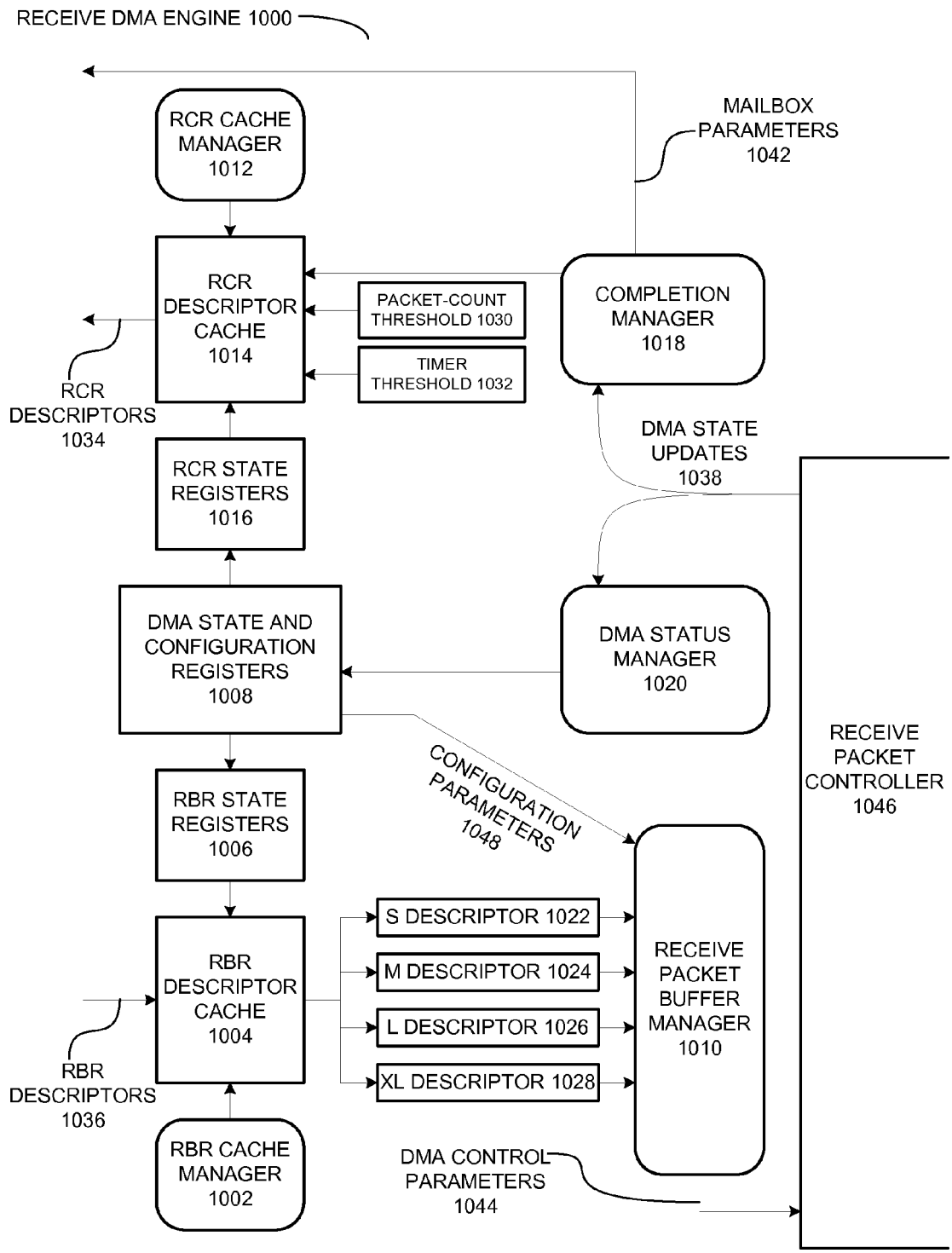
FIG. 10 illustrates an exemplary implementation for a receive DMA engine in accordance with an embodiment of the present invention.

FIG. 10 illustrates an exemplary implementation for a receive DMA engine in accordance with an embodiment of the present invention.

Receive DMA engine 1000 can be configured to manage the transfer of data packets from a hardware queue of a network interface unit (NUI) to main memory of a computing device. Receive DMA engine 1000 can maintain RBR descriptor 1034 and RCR descriptors 1036, can manage memory buffer control information for a receive packet controller 1046, and can manage packet status information for a software driver. Receive DMA engine 1000 can include an RBR cache manager 1002, an RBR descriptor cache 1004, a set of RBR state registers 1006, and a set of DMA state and configuration registers 1008 which store state and configuration information.

Receive DMA engine 1000 can use RBR cache manager 1002 to pre-fetch RBR buffer descriptors from main memory into RBR descriptor cache 1004, thereby minimizing the overhead in processing an RBR descriptor, and minimizing the effects from main memory access latencies. RBR descriptor cache 1004 can be a local hardware write-back cache which can provide space for at least 16 cache entries.

RBR cache manager 1002 can perform a continuous background process which monitors the RBR cache occupancy, and ensures that there is always an adequate supply of free memory buffers for receive DMA engine 1000 to use for storing data packets that it receives. When cache occupancy for RBR descriptor cache 1004 becomes half-full and the NIU has additional free memory buffers pending in main memory, RBR cache manager 1002 loads a new set of buffer descriptors into RBR descriptor cache 1004 for these free memory buffers. The descriptor pre-fetch load can contain the lesser of the following two quantities of descriptors: the number of buffer descriptors that were "kicked" or eight descriptors.

Once RBR descriptor cache 1004 has been loaded with buffer descriptors, the receive packet buffer manager 1010 "pops" them out of RBR descriptor cache 1004 and pre-allocates a descriptor for each size category for a packet buffer (i.e., S, M, L and XL). The pre-allocated descriptors of size categories S, M, L and XL are shown in FIG. 10 as descriptors 1022, 1024, 1026, and 1028, respectively. From here on, a memory buffer associated with one of the pre-allocated descriptors will be used to store the type of packets configured for the corresponding packet size category. Receive packet buffer manager 1010 can interpret the fields of memory buffer descriptors 1022, 1024, 1026, and 1028, and pass the relevant DMA control parameter 1044 to receive packet controller 1046 to schedule future receive packet transfers. When a memory buffer of a given size category is fully consumed, the next descriptor is "popped" from RBR descriptor cache 1004 and allocated to the packet size category associated with the consumed memory buffer.

RBR state registers 1006 indicate the size and the boundaries of the RBR stored in main memory, and the current pointers (i.e., the head and tail pointers) of the hardware/software RBR management state. DMA state and configuration registers 1008, which can be managed by DMA status manager 1020, reflect the DMA state of the current receive packet DMA operation based in part on periodic DMA state updates 1038 from the receive packet controller. DMA state and configuration registers 1008 can provide configuration parameters 1048 for a DMA channel, which can include: the size of a packet buffer for a memory buffer, the start offset of a receive packet from the beginning of a packet buffer, and an indicator for whether the VLAN (Virtual Local Area Network) tag needs to be removed from a received data packet before the packet is stored in main memory.

Once a received data packet is transferred to main memory, receive DMA engine 1000 can use completion manager 1018 to post a completion descriptor on the RCR. Note that similar to the RBR descriptor cache 1004, receive DMA engine 1000 maintains RCR descriptor cache 1014 as a local hardware write-back cache for the RCR. RCR descriptor cache 1014 can provide space for at least 16 cache entries. Further, receive DMA engine 1000 can include RCR state registers 1016, and can use RCR cache manager 1012 to manage RCR descriptor cache 1014.

Ideally, completion updates to the RCR should be performed using eight descriptor entries (64 bytes) at a time. However, since packet arrival is unpredictable, and also in order to control the packet arrival latency, a packet counter and a timer are provided. RCR cache manager 1012 monitors the occupancy for RCR descriptor cache 1014, and stores the contents of RCR descriptor cache 1014 in the RCR stored in main memory once a packet-count-threshold 1030 is satisfied, or a timer threshold 1032 is satisfied. Then, receive DMA engine 1000 can optionally generate an interrupt, and/or can create a mailbox entry in main memory using mailbox parameters 1042.

A register in RCR state registers 1016 indicates the size and the boundary of the RCR stored in main memory, and the current pointers (i.e., the head and tail pointers) of the hardware/software completion management state.

Receive Packet Controller

Figure 11:
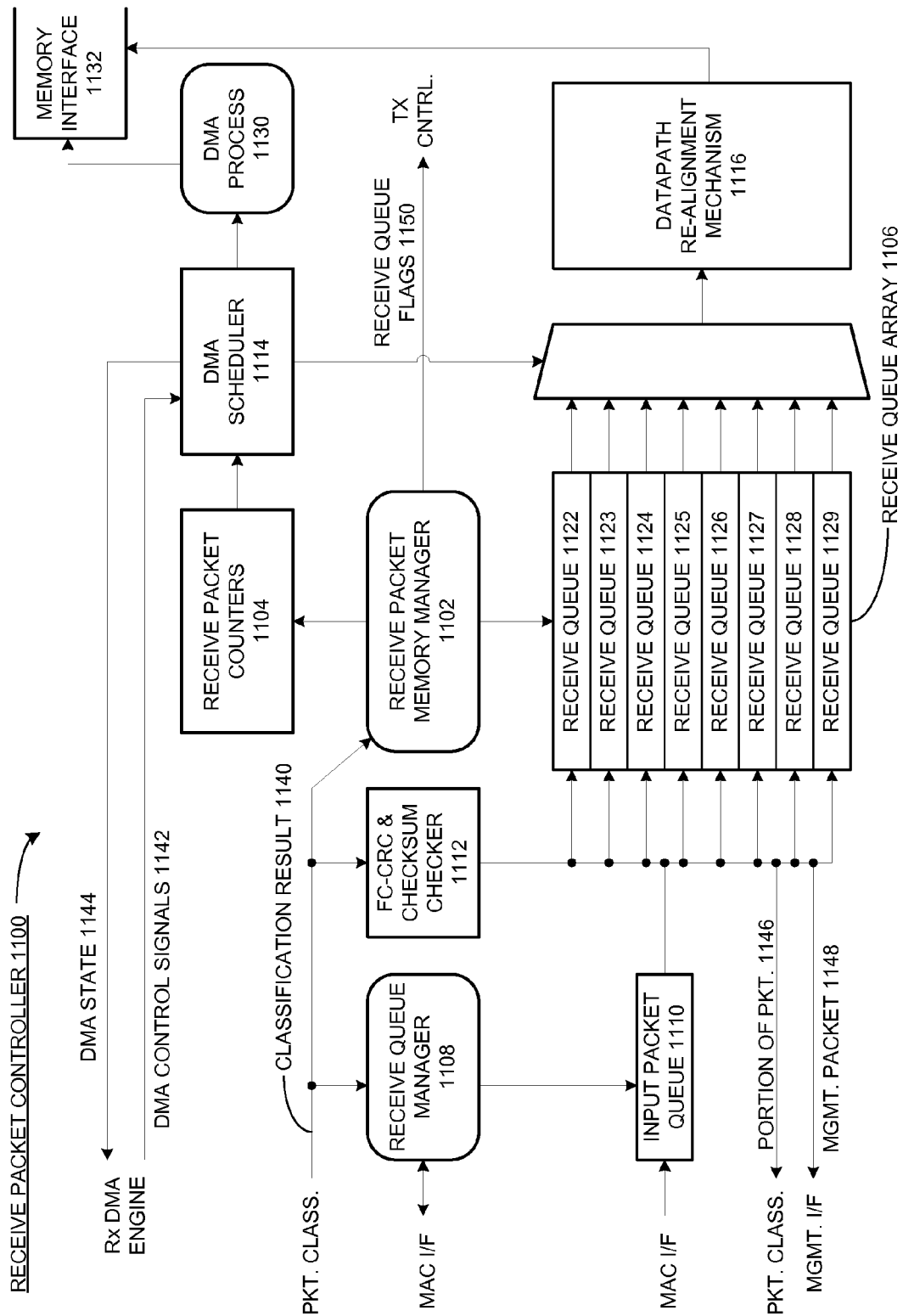
FIG. 11 illustrates an exemplary implementation of a receive packet controller in accordance with an embodiment of the present invention.

FIG. 11 illustrates an exemplary implementation of a receive packet controller in accordance with an embodiment of the present invention. Receive packet controller 1100 can help manage the transfer of data packets from a computer network to main memory of a computing device. More specifically, receive packet controller 1100 can manage operations for accepting a data packet from the computer network (e.g., "sink" and "sort" operations), can temporarily queue a data packet in an internal FIFO (e.g., a "store" operation), and can use a DMA channel to write a data packet onto main memory (e.g., a "push" operation).

Receive packet controller 1100 can include receive packet memory manager 1102, receive packet counters 1104, receive queue array 1106, receive queue manager 1108, input packet queue 1110, FC-CRC and checksum checker 1112, DMA scheduler 1114, and datapath re-alignment mechanism 1116. Note that receive queue array 1106 can include a set of logically independent receive queues (e.g., receive queues 1122-1129), which can be stored in a FIFO shared memory which can be accessed by different modules of the network interface unit.

Receive-packet memory manager 1102 can enforce the independent queue structure of receive queue array 1106 by managing a start pointer and an end pointer for each receive queue in receive queue array 11106. This allows a dynamic queue sizing algorithm to change the size of a receive queue at runtime by re-programming the start pointer and/or the end pointer associated with the receive queue. The dynamic queue sizing algorithm can be implemented in a software driver of the computing device, or can be implemented in a hardware mechanism of receive packet controller 1100.

A medium access controller (MAC) can initiate processing for a received packet by loading the packet into input packet queue 1110. Input packet queue 1110 is a staging FIFO that can hold the packet until its receive queue has been determined. After the packet headers have been loaded into input packet queue 1110, receive queue manager 1108 sends portion of the packet 1146, or the entire packet to a packet classifier. For example, receive queue manager 1108 can send the first 128 bytes of a packet or the entire packet, whichever is less, to the packet classifier.

The packet classifier (not shown) can generate classification result 1140 which indicates a receive queue in receive queue array 1106 where the packet should be temporarily stored, the DMA channels that should be used to move the packet to main memory, an offset value for computing a packet checksum field, and whether the received packet is VLAN tagged.

If the packet classifier determines that a packet is a management packet, receive packet controller 1100 can send management packet 1148 to a management interface. Otherwise, if the packet classifier determines that the packet is not a management packet, receive packet controller 1100 can store the packet in the appropriate receive queue of receive queue array 1106. If the target receive queue does not have space available for the packet, receive packet controller 1100 can drop the packet. Note that a threshold parameter which specifies the maximum size for the receive queue can be programmed by the software driver.

The checksum field and the fibre-channel cyclic redundancy check (FC-CRC) field for the packet can be computed on-the-fly as the packet moves from input packet queue 1110 to receive queue array 1106.

Receive packet controller 1100 can insert a control field into the first 128-bit entry of a packet prior to storing the packet in a receive queue of receive queue array 1106. This entry is marked by a control bit (tag) in the receive queue, and it serves as the first demarcation point for the packet's boundary, e.g., a start-of-packet (SOP) boundary. The entry contains relevant information required for processing the packet in later stages of the datapath (e.g., the DMA vector, a VLAN-tagged indication, a packet length for a store-and-forward operation, etc.).

Receive packet controller 1100 can also insert a status field into the last 128-bit entry of a data packet once the packet has been completely transferred into a receive queue of receive queue array 1106. This entry is marked by a control bit (tag) in the receive queue, and it serves as the second demarcation point for the packet's boundary, e.g., an end-of-packet (EOP) boundary. This entry can include packet status information regarding a number of various error conditions encountered while processing the packet (e.g., an aborted packet, an Ethernet error, an FC-CRC error, a checksum error, etc.), and the packet length (e.g., for a cut-through operation).

A receive queue in receive queue array 1106 can be assigned a number of attributes which specify how the receive queue is to handle a received packet. The assigned attributes specify a usage model for the receive queue, which can depend on the types of network traffic that are supported by a network interface at a specific point in time, and can depend on an expected quality of service for a traffic flow.

One possible attribute for a receive queue indicates whether the receive queue operates in a "cut-through" or a "store-and-forward" mode of operation to control packet latency. When operating in a store-and-forward mode of operation, a DMA associated with a receive queue will only be scheduled if there is at least one packet residing in the receive queue (based in part on a counter value, in receive packet counters 1104, for the receive queue). When operating in a cut-through mode of operation, a DMA associated with a receive queue will be scheduled if there is at least one packet residing in the receive queue, or a portion of a packet has been loaded into the receive queue based on a programmable threshold. Note that for a receive queue which has been configured to operate in a cut-through mode of operation, the DMA channels bound to the receive queue will be configured to use receive buffers associated with one common size category (e.g., S, M, L or XL). This is due to the fact that when a packet's transfer to main memory starts, the packet length is not yet available to the hardware.

A second possible attribute for a receive queue indicates whether the receive queue operates in a "blocking" or a "non-blocking" mode of operation. When operating in a non-blocking mode of operation, a packet at the head of a receive queue is dropped if a DMA associated with the receive queue cannot be scheduled for any reason (e.g., RBR empty, or RCR full). In contrast, if a DMA cannot be scheduled when the receive queue is operating in the blocking mode of operation, the receive queue will stall. This can create back-pressure in the receive queue, and can cause head-of-the-line blocking for other DMAs associated with the receive queue.

If a receive queue becomes congested (i.e., full) during the packet's transfer from input packet queue 1110, the packet's transfer is aborted and its remainder is flushed from input packet queue 1110 and discarded. If the receive queue is operating in the store-and-forward mode of operation, receive packet memory manager 1102 rewinds the write pointer for the receive queue and reuses the available space in the receive queue for the next packet. Otherwise, if the receive queue is operating in the cut-through mode of operation, the packet fragment in the receive queue is marked as "aborted" in the status entry at the end of the packet, and no further action is taken on the packet fragment.

DMA scheduler 1114 arbitrates and schedules DMA packet transfers from receive queue array 1106 to main memory via DMA process 1130 and memory interface 1132. DMA scheduler can receive DMA control signals 1142 from the receive DMA engine. Note that a receive queue can have multiple DMA channels (i.e., receive DMA mechanisms) associated with it. At any given time, a DMA channel is bound to one receive queue. The scheduling criteria can follow these principles:

- A receive queue is selected for a next packet transfer based on a deficit weighted round robin arbitration policy.
- A receive queue is assigned a "weight" attribute which is proportional to the percentage of the total receive DMA bandwidth. A weight of zero percent indicates that the corresponding receive queue is disabled. In contrast, a weight of 100% indicates that the corresponding receive queue has preemptive priority. If more than one receive queue in receive queue array 1106 has been assigned a preemptive priority, the receive queue with a higher number will have precedence. Once a packet DMA transfer has commenced, the packet DMA transfer runs to completion. If a packet's transfer exceeds a receive queue's assigned weight, the receive queue will be compensated at the next scheduled opportunity.
- A receive queue participates in an arbitration cycle if it has met the minimum criteria for DMA scheduling associated with a "cut-through" or a "store-and-forward" mode of operation.
- Once a receive queue has been selected, the control entry in the status field of the packet at the head of the receive queue is unloaded and parsed. The DMA vector indicates a set of DMAs that should be scheduled for the packet transfer. If the indicated DMA channel is ready, it is scheduled for the next transfer. Otherwise, if the indicated DMA is not ready for any reason, then:
    - If the receive queue has been assigned a "non-blocking" attribute, the DMA process unloads the packet from the receive queue without scheduling a DMA transfer (i.e., packet drop), and the arbiter moves on to the next arbitration cycle.
    - If the receive queue has been assigned a "blocking" attribute, the arbiter moves on to the next arbitration cycle with no further action.
- If the status entry at the end of the packet indicates an error condition, then DMA process 1130 provides two options for handling the packet (programmable, per error condition):
    - Create an RCR entry for the packet such that the packet status field in the completion descriptor specifies the error condition. This allows the software driver to monitor rare and/or unexpected error conditions.
    - Reuse the current packet buffer for the next packet obtained from the receive queue. This effectively drops the current packets in the packet buffer, making the erroneous packets invisible to software.

Multicast traffic can have a dedicated receive queue assigned to it, or it can be combined with unicast traffic in the same receive queue, depending on the classification attributes received from the packet classifier. In either case, the DMA vector for multicast traffic may have multiple DMA bits set.

For this type of traffic, DMA scheduler 1114 schedules multiple transfers of the same packet using multiple DMA channels. The scheduling criteria (e.g., "weights," etc.) for the receive queue with a pending multicast packet follows the same guidelines as when multiple packets are being transferred from the receive queue. The packet is removed from the receive queue after the last DMA transfer has been completed. Note that replicating a multicast packet creates head-of-the-line blocking within a receive queue, but not between two or more receive queues. Therefore, this type of packet traffic should be assigned to a separate receive queue.

Once a DMA transfer has been scheduled, DMA process 1130 controls the entire packet transfer to main memory via memory interface 1132, with periodic DMA state 1144 updates to the DMA channel in use. While the packet is being transferred to main memory, datapath re-alignment mechanism 1116 performs the following functions:

Removes the VLAN tag from received packets that contain a VLAN tag (as indicated in the control entry at the beginning of the packet), if the DMA channel in use has been configured to do so.

Adds a programmable offset at the beginning of the packet buffer prior to storing the received packet, if the DMA channel in use has been configured to provide a packet start offset. This offset can be used to align packet protocol headers and payloads to a given byte boundary as a means to facilitate processing certain traffic flows. This programmable offset can also be used to spread received traffic among multiple main memory banks for different DMA channels.

Receive packet controller 1100 can achieve a priority flow control of the remote end of a DMA link by configuring receive packet memory manager 1102 to continuously monitor and provide the occupancy state of receive queues 1122-1129 to a transmit controller via receive queue flags 1150. This vector reflects the state of a receive queue relative to two programmable thresholds per receive queue: one for generating an XOFF (i.e., transmit off) flow control code, and one for generating an XON (i.e., transmit on) flow control code.

Figure 12:
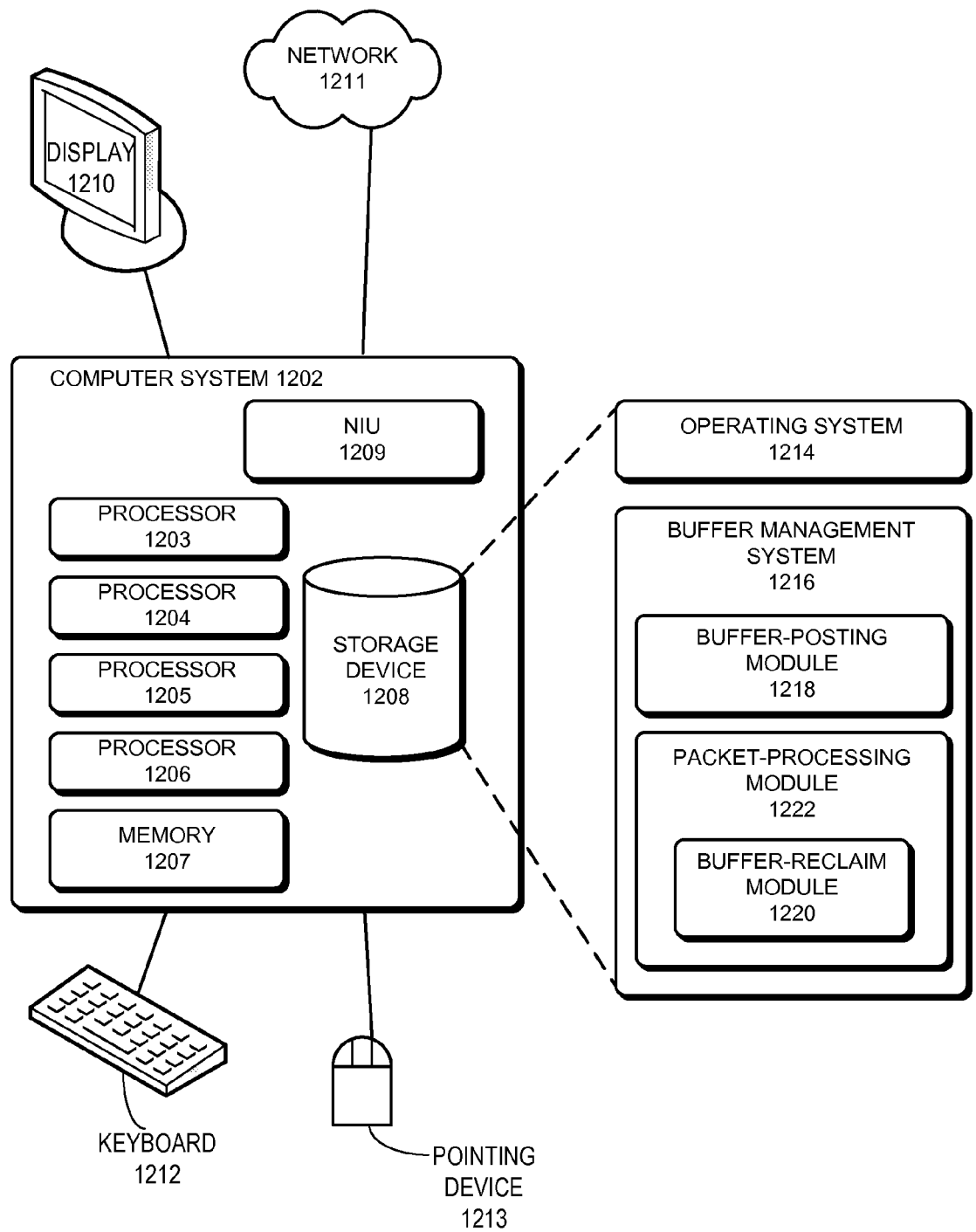
FIG. 12 illustrates an exemplary computer system for receiving data packets via a computer network in accordance with an embodiment of the present invention.

FIG. 12 illustrates an exemplary computer system for receiving data packets via a computer network in accordance with an embodiment of the present invention. Computer system 1202 includes a set of processors 1203-1206, a memory 1207, a storage device 1208, and includes an NIU 1209 that facilitates receiving data packets via a network 1211 such as the Internet. Furthermore, computer system 1202 can be coupled to a display device 1210, a keyboard 1212, and a pointing device 1213.

Storage device 1208 can store operating system 1214 and buffer management system 1216. Buffer management system 1216 can include a buffer-posting module 1218, a buffer-reclaim module 1220, and a packet-processing module 1222. Some or all portions of buffer management system 1216 can be part of the operating system.

In one embodiment, buffer management system 1216 is loaded from storage device 1208 into memory 1206 and is executed by a processor. Buffer management system 1216 can allocate a memory buffer in memory 1207, and buffer-posting module 1218 can post a descriptor for memory buffer 1228 on the RBR of NIU 1209. NIU 1209 can post a completion descriptor for a packet buffer on the RCR of NIU 1209, and notify packet-processing module 1222 that completion descriptor 1234 has been posted. Packet-processing module 1222 can perform preliminary processing on data packets. Furthermore, packet-processing module 1222 may include buffer-reclaim module 1220 which may reclaim the memory buffer if the RCR descriptor indicates that the memory buffer is ready to be reclaimed.

Figure 13:
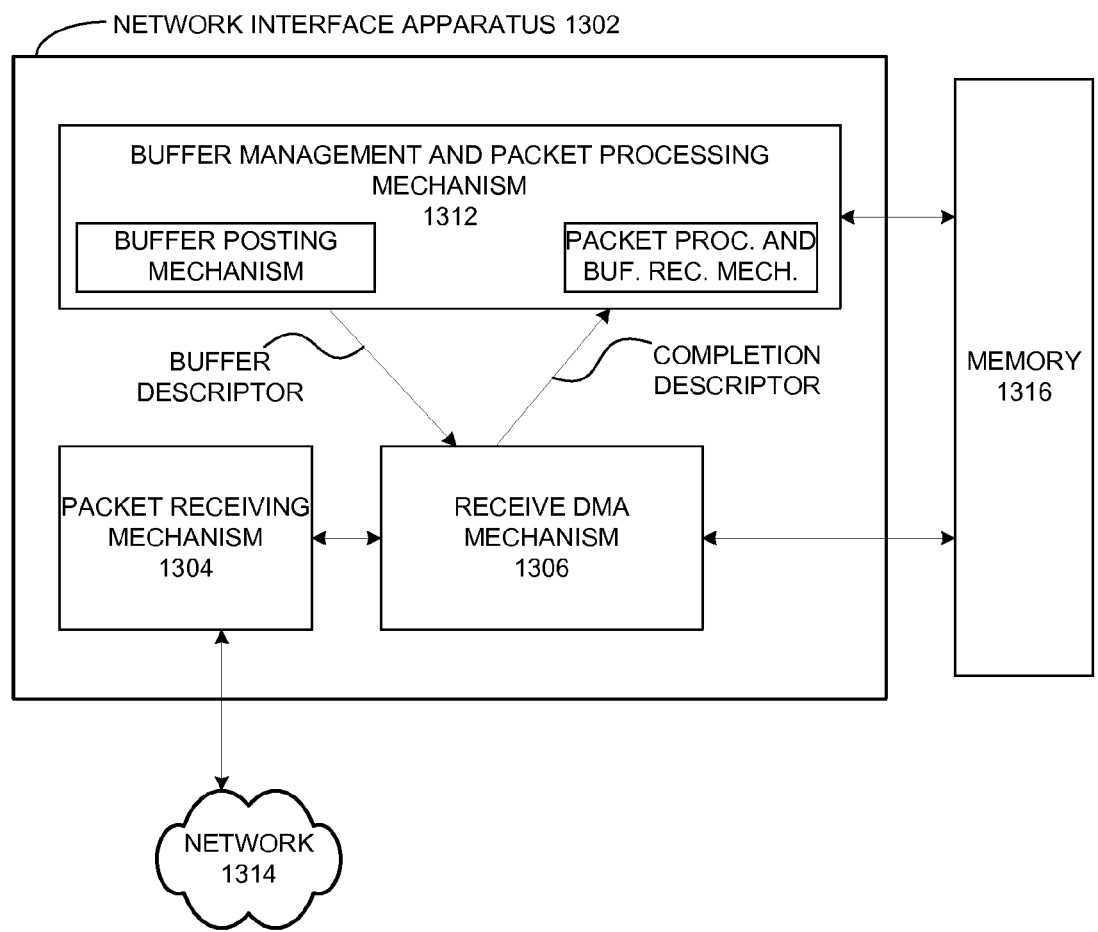
FIG. 13 illustrates an apparatus for receiving data packets via a computer network in accordance with an embodiment of the present invention.

FIG. 13 illustrates an apparatus for receiving data packets via a computer network in accordance with an embodiment of the present invention. Apparatus 1302 can comprise a number of mechanisms which may communicate with one another via a wired or wireless communication channel. Apparatus 1302 may be realized using one or more integrated circuits, and it may be integrated in a computer system, or it may be realized as a separate device which is capable of communicating with other computer systems and/or devices. Specifically, network interface apparatus 1302 can include a packet receiving mechanism 1304, a receive DMA mechanism 1306, and a buffer management and packet processing mechanism 1312. Buffer management and packet processing mechanism 1312 can include a buffer posting mechanism and a packet processing and buffer reclaiming mechanism.

Packet receiving mechanism 1304 (e.g., a transceiver) can receive packets from network 1314, and receive DMA mechanism 1306 can maintain the RBR and RCR that control the recycling of memory buffers. Apparatus 1302 can allocate a memory buffer in memory 1316, and buffer management and packet processing mechanism 1312 can post a buffer descriptor for the memory buffer on the RBR of receive DMA mechanism 1306. Once a packet is stored in memory, receive DMA mechanism 1306 can post a completion descriptor on the RCR, and notify buffer management and packet processing mechanism 1312 that the completion descriptor has been posted. Buffer management and packet processing mechanism 1312 can then perform processing on the packets and reclaim the memory buffer if the completion descriptor indicates that the memory buffer should be reclaimed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for receiving a packet on a multi-threaded computing device which uses a memory-buffer-usage scorecard to enable multiple hardware threads to share a common pool of memory buffers, the method comprising:

identifying a memory-descriptor location for posting a memory descriptor for a memory buffer;

posting the memory descriptor for the memory buffer at the memory-descriptor location;

updating the memory-buffer-usage scorecard to indicate that the memory buffer is in use;

storing a packet in the memory buffer;

posting a completion descriptor in a completion-descriptor location to indicate that the packet is ready to be processed; and in response to determining that the completion descriptor indicates that the memory buffer is ready to be reclaimed, reclaiming the memory buffer, and updating the memory-buffer-usage scorecard to indicate that the memory buffer has been reclaimed;

wherein the memory-descriptor location is a receive buffer ring (RBR) entry and the completion-descriptor location is a receive completion ring (RCR) entry, and wherein the memory-buffer-usage scorecard is a buffer-posting and reclaim array (BPRA) which is partitioned into multiple regions so that a BPRA entry in each BPRA region is associated with an RPR entry.

2. The method of claim 1, wherein the memory descriptor includes a memory buffer address field.

3. The method of claim 1, wherein the memory descriptor includes a buffer index field which specifies an offset into a buffer address lookup table.

4. The method of claim 1, wherein the memory descriptor includes a BPRA region field.

5. The method of claim 1, wherein updating the memory-buffer-usage scorecard to indicate that the memory buffer is in use comprises:
    identifying a first BPRA entry in a first BPRA region which is associated with the RBR entry where the memory descriptor for the memory buffer is desired to be posted;
    in response to determining that the first BPRA entry indicates that a memory buffer associated with the first BPRA entry has not been reclaimed, identifying a second BPRA entry in a second BPRA region which is associated with the first RBR entry, wherein the second BPRA entry indicates that a memory buffer associated with the second BPRA entry has been reclaimed; and
    modifying the second BPRA entry to indicate that a memory buffer associated with the second BPRA entry has not been reclaimed.

6. The method of claim 5, wherein in response to determining that the first BPRA entry indicates that a memory buffer associated with the first BPRA entry has not been reclaimed, the method further comprises storing an indicator which indicates the first BPRA entry's location in the first BPRA region.

7. The method of claim 6, wherein the indicator is used to determine which BPRA region to use when a BPRA entry in a current BPRA region is unavailable.

8. The method of claim 1, wherein the completion descriptor includes a memory-buffer-type field which indicates the size of the packets that are stored in the memory buffer.

9. The method of claim 1, wherein the completion descriptor includes a packet offset field which indicates the packet's location in the first memory buffer.

10. The method of claim 1, wherein the completion descriptor includes a packet length field which indicates the packet's length.

11. The method of claim 1, wherein the completion descriptor includes a packet status field which indicates the packet's status.

12. The method of claim 1, wherein the completion descriptor includes a buffer index field which specifies an offset into a buffer address lookup table.

13. A non-transitory computer storage medium storing instructions that when executed by a computer cause the computer to perform a method for receiving a packet on a multi-threaded computing device which uses a memory-buffer-usage scorecard to enable multiple hardware threads to share a common pool of memory buffers, the method comprising:
    identifying a memory-descriptor location for posting memory descriptor for a memory buffer;
    posting the memory descriptor for the memory buffer at the memory-descriptor location;
    updating the memory-buffer-usage scorecard to indicate that the memory buffer is in use;
    storing a packet in the memory buffer;
    posting a completion descriptor in a completion-descriptor location to indicate that the packet is ready to be processed; and
    in response to determining that the completion descriptor indicates that the memory buffer is ready to be reclaimed,
        reclaiming the memory buffer, and
        updating the memory-buffer-usage scorecard to indicate that the memory buffer has been reclaimed;
    wherein the memory-descriptor location is a receive buffer ring (RBR) entry and the completion-descriptor location is a receive completion ring (RCR) entry, and wherein the memory-buffer-usage scorecard is a buffer-posting and reclaim array (BPRA) which is partitioned into multiple regions so that a BPRA entry in each BPRA region is associated with an RPR entry.

14. An apparatus for receiving a packet on a multi-threaded computing device which uses a memory-buffer-usage scorecard to enable multiple hardware threads to share a common pool of memory buffers, the apparatus comprising:
    a memory;
    a buffer posting mechanism configured to:
        identify a memory-descriptor location for posting a memory descriptor for a memory buffer;
        post the memory descriptor for the memory buffer at the memory-descriptor location; and
        update the memory-buffer-usage scorecard to indicate that the memory buffer is in use; and
    a packet processing and buffer reclaiming mechanism to:
        store a packet in the memory buffer;
        post a completion descriptor in a completion-descriptor location to indicate that the packet is ready to be processed; and
        in response to determining that the completion descriptor indicates that the memory buffer is ready to be reclaimed,
            reclaim the memory buffer, and
            update the memory-buffer-usage scorecard to indicate that the memory buffer has been reclaimed;
    wherein the memory-descriptor location is a receive buffer ring (RBR) entry and the completion-descriptor location is a receive completion ring (RCR) entry, and wherein the memory-buffer-usage scorecard is a buffer-posting and reclaim array (BPRA) which is partitioned into multiple regions so that a BPRA entry in each BPRA region is associated with an RPR entry.

* * * * *